United States Patent [19]

McCooeye

[11] 4,209,234
[45] Jun. 24, 1980

[54] DEFOGGING EYE GLASSES

[76] Inventor: Donald E. McCooeye, 1 Sullivan Ave., Ottawa, Ontario, Canada

[21] Appl. No.: 911,969

[22] Filed: Jun. 2, 1978

[51] Int. Cl.² .............................................. G02C 11/08
[52] U.S. Cl. ...................................................... 351/62
[58] Field of Search .................. 351/158, 41, 154, 62; 350/201, 61; D16/57, 54

[56] References Cited

U.S. PATENT DOCUMENTS

| | | | |
|---|---|---|---|
| 3,160,735 | 12/1964 | Aufricht | 52/435 |
| 3,624,347 | 11/1971 | Todd | 350/61 |
| 3,686,473 | 8/1972 | Shirn et al. | 350/61 |
| 3,900,672 | 8/1975 | Hammond et al. | 350/61 |
| 4,037,286 | 7/1977 | Medaris et al. | 350/61 |

FOREIGN PATENT DOCUMENTS 545633  9/1957  Canada ..................... 351/158

*Primary Examiner*—John K. Corbin
*Assistant Examiner*—B. Wm. de los Reyes

[57] ABSTRACT

A defogging system for eye glasses comprising an electrical circuit means associated with the frame of the eye glasses. A first electrical contact is positioned on one side of each of the rims thereof so as to be in contact with the lens when in position in the rim, and a corresponding second electrical contact, not contacting the first, is located on the opposite side of each rim so as to be in contact with the lens when in position in the rim. An electrical circuit means is provided to carry current from a power source positioned in the frame to the first electrical contacts in the rims and from the second electrical contacts in the rims back to the power source. Appropriate on-off switch means are provided. The rims of the eye glasses are provided with lenses coated with a conductive transparent film, the film being in electrical contact with the first and second electrical contacts.

9 Claims, 4 Drawing Figures

DEFOGGING EYE GLASSES

BACKGROUND OF THE INVENTION

This invention relates to a defogging system for lenses, and more particularly relates to an electronic lens defogging system which may be incorporated into spectacles or the like.

Persons who wear eye glasses, particularly in colder climates, are constantly faced with the problem of fogging or steaming of eye glass lenses when, for example, they enter a warm building from the cold outside. This problem of condensation of moisture droplets from the surrounding area onto the colder surface of the lenses persists until the eye glasses warm up to a temperature approaching that of the surrounding air. In fact, any sudden temperature change under many and varying conditions may result in foggy lenses.

Solutions for this problem have included a type of silicon coating which may be applied, on a periodical basis, to the surface of the lens, which coating absorbs moisture which might condense thereon. Alternatively, Harrison, U.S. Pat. No. 3,015,987, issued Jan. 9, 1962 provides a ventilated frame for lenses which enhances air circulation near the surface of lenses in eye glasses and the like, which air ventilates the lenses and reduces moisture accumulation and deposition thereon. Ventilated goggles, for example for skiers, are also well-known in the art.

It is an object of the present invention to provide an alternative, novel means for reducing or removing condensation from the surfaces of lenses of eye glasses to permit the wearer to have vision uninterrupted by foggy or cloudy lenses. It is a further object of the present invention to provide an electronic system for defogging such lenses which is incorporated into the frame of the eye glasses.

SUMMARY OF THE INVENTION

In accordance with the present invention, a defogging system is provided for eye glasses and the like comprising an electrical circuit means associated with the frame of the eye glasses. A first electrical contact is positioned on one side of each of the rims thereof so as to be in contact with the lens when in position in the rim, and a corresponding second electrical contact, not contacting the first, is located on the opposite side of each rim so as to be in contact with the lens when in position in the rim. An electrical circuit means is provided to carry current from a power source positioned in the frame to the first electrical contacts in the rims and from the second electrical contacts in the rims back to the power source. Appropriate on-off switch means are provided. The rims of the eye glasses are provided with lenses coated on one or both sides with a conductive transparent film, the film being in electrical contact with the first and second electrical contacts.

The wearer, when foggy lenses are experienced or anticipated, by switching the circuitry on, causes current to flow through the conductive film on the lens. Heat is generated as a result, which heat elevates the temperature of the lenses until condensation is either removed from or can no longer take place on the surfaces of the lenses. In a preferred embodiment of the invention, a miniaturized thermostat control is associated with the lens to permit current flow when the temperature of the lens goes below a certain, predetermined level, and to cut off that current flow above that level. As well, in a further preferred embodiment, a knife switch is provided in the pivot point of one of the temples of spectacles, such that, when the temples are open for wearing, the switch completes the circuit to permit current flow, but when the temples are closed, for example when the glasses are not being worn, the circuit is interrupted so that no current will flow.

BRIEF DESCRIPTION OF THE DRAWINGS

Other objects and advantages of the invention will become apparent upon reading the following detailed description and upon referring to the drawings in which.

In the drawings, similar features have been given similar reference numerals.

While the invention will be described in connection with example embodiments thereof, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

Figure 1:
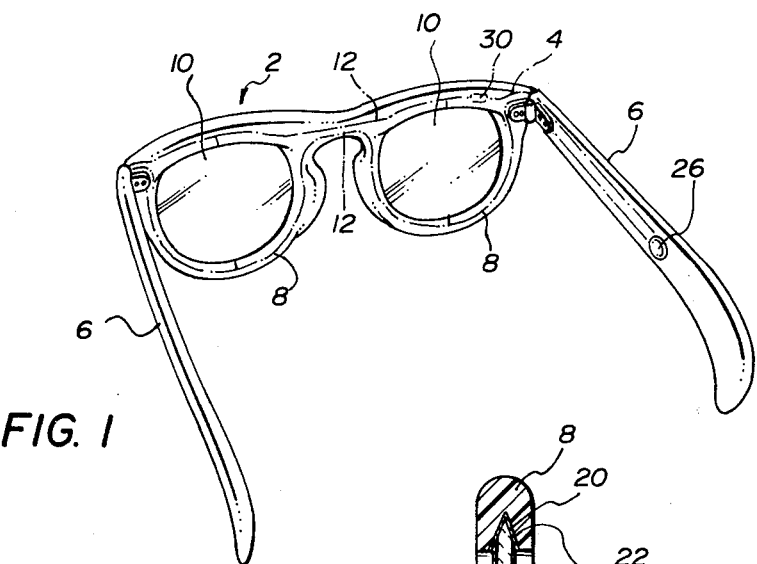
FIG. 1 is a perspective view of a pair of spectacles incorporating the present invention.
Figure 2:
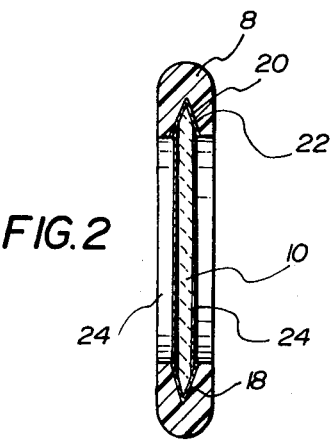
FIG. 2 is an enlarged diagrammatic cross-sectional view through one rim and lens.
Figure 4:
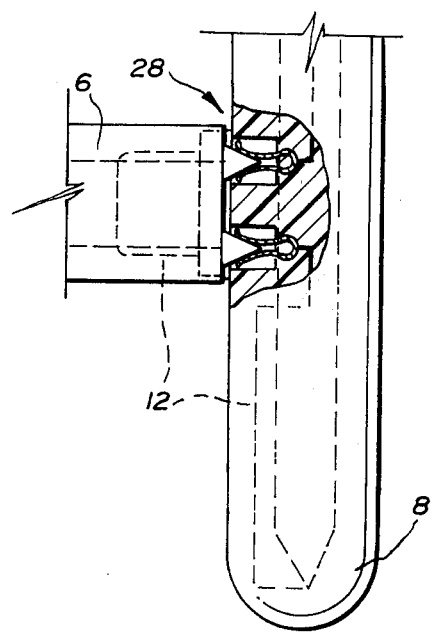
FIG. 4 is a detail of a knife switch incorporated in the pivot point of one of the temples of the eye glasses of FIG. 1.
Figure 3:
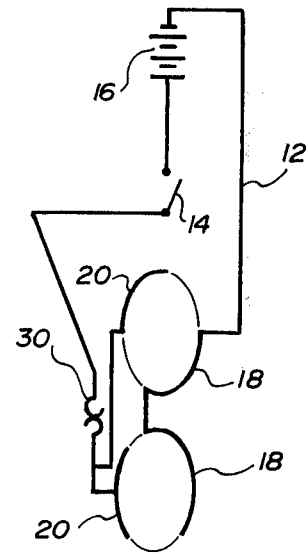
FIG. 3 is a schematic drawing of the circuitry incorporated in the eye glasses of FIG. 1.

Turning to FIG. 1, there is shown a set of eye glasses 2 having frame 4 consisting of temples 6 and rims 8, lenses 10 being securably seated in rims 8. Nose bridge 12 joins rims 8. The eye glasses are provided with a defogging system which includes circuit 12 (FIG. 3), on-off switch 14, power source 16. Current from power source 16 is taken along circuit 12 to a first electrical contact 18 in each rim and from a second electrical contact 20 in each rim back to power source 16. In the embodiment illustrated, electrical contacts 18 and 20 are elongated extending along a major portion of the length of lens holding groove 22 on opposite sides of rims 8. To complete the circuit, lens 10 is coated on both sides with a transparent, conductive coating 24 made from an appropriate metal or metal oxide. The power source comprises, for example, a miniature battery or solar cell 26 seated in one of the temples 6. The electrical circuit extending along the temple and the elongated electrical contacts 18 and 20 may be provided by a suitable conductive paint applied to the appropriate surfaces.

In the embodiment illustrated, knife switch 28 is associated with the circuit at the pivot of temple 6 so that when the temple is open and in position for wearing, the switch operates to complete the circuit, and it operates when the temple is folded and in position for non-use of the eye glasses to close the circuit. As well, a miniature thermostat 30 is associated with circuit 12 and lenses 10 such that, when the temperature of the lenses falls below a certain, predetermined temperature, below which condensation would be likely to occur on the surface of the lens, the current can flow if switch 28 is on. Above that temperature, the thermostat would not permit that current to flow.

It will be understood that alternative forms of on-off switches for the circuitry, and alternative forms of contact between the lens coating 24 and circuitry carried by rims 8, for example, may be provided without departing from the spirit of the invention.

Thus it is apparent that there has been provided, in accordance with the invention, a defogging system for eye glasses and the like that fully satisfies the objects, aims and advantages set forth above. While the invention has been described in conjunction with an example embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim as my invention:

1. In a frame for supporting lenses in front of the eyes of a wearer comprising rims for the lenses, a nose bridge joining the rims, and hinged temples pivotably secured to the outside edges of the rims, the improvement consisting of an electronic lens defogging system incorporated into the frame, the system comprising an electrical circuit means comprising conductive circuitry associated with the frame, a first electrical contact on one side of each rim so as to be in contact with conductive means on the lens when in position in the rim, and a corresponding second electrical contact not contacting the first and located on the opposite side of each rim so as to be in contact with said conductive means on the lens when in position in the rim, the circuit means arranged to carry current from a power source positioned in the frame to the first electrical contact in each rim and from the second electrical contact in each rim back to the power source, and circuit on-off switch means associated with one of the temples, the system being further provided with a thermostat control means activated by the temperature of the lens, whereby the circuit is completed when the temperature of the lens falls below a predetermined temperature.

2. A frame according to claim 1, having first elongated electrical contact extending along a major portion of the length of one side of each rim so as to be in contact with the lens when in position in the rim, and corresponding second elongated electrical contact not contacting the first and extending along a major portion of the length of the opposite side of each rim so as to be in contact with the lens when in position in the rim.

3. A frame according to claim 1, wherein one of the temples of the frame has a portion of the circuit means thereon and the on-off switch means comprises a knife switch located at the pivot of that temple, which switch operates to complete the circuit when that temple is open and in position for wearing, and to close the circuit when the temple is folded and in position for non-use.

4. A frame according to claim 3, wherein at least a portion of the circuit is formed from conductive paint applied to the surface of the frame.

5. A frame according to claim 4, further provided with a lens in each rim, the lens being coated with a conductive transparent film, the film being in electrical contact with the first and second electrical contacts.

6. A frame according to claim 1, further provided with a lens in each rim, the lens being coated with a conductive transparent film, the film being in electrical contact with the first and second electrical contacts.

7. A frame according to claim 6, wherein the lenses are coated on both sides with the conductive transparent film.

8. A frame according to claim 6, wherein the conductive transparent film comprises a transparent metal oxide film or a transparent metal film.

9. A frame according to claim 6, wherein the power source comprises a battery or a solar cell.

* * * * *